(12) United States Patent
Gierer (10) Patent No.: US 11,864,720 B2
(45) Date of Patent: Jan. 9, 2024

(54) RECHARGEABLE BATTERY FOR POWERING A VACUUM CLEANER

(71) Applicant: Emerson Electric Co., St. Louis, MO (US)

(72) Inventor: Joseph T. Gierer, Glen Carbon, IL (US)

(73) Assignee: Emerson Electric Co., St. Louis, MO (US)

( * ) Notice: Subject to any disclaimer, the term of this patent is extended or adjusted under 35 U.S.C. 154(b) by 528 days.

(21) Appl. No.: 16/725,403

(22) Filed: Dec. 23, 2019

(65) Prior Publication Data

US 2020/0129027 A1 Apr. 30, 2020

Related U.S. Application Data

(62) Division of application No. 15/620,153, filed on Jun. 12, 2017, now Pat. No. 10,687,678.

(51) Int. Cl.
| | |
|---|---|
| *A47L 9/28* | (2006.01) |
| *A47L 5/28* | (2006.01) |
| *H02J 7/00* | (2006.01) |
| *H01M 50/271* | (2021.01) |
| *H01M 50/262* | (2021.01) |
| *H01M 50/202* | (2021.01) |

(Continued)

(52) U.S. Cl.
CPC ............... *A47L 9/2873* (2013.01); *A47L 5/28* (2013.01); *A47L 9/2884* (2013.01); *H01M 50/202* (2021.01); *H01M 50/244* (2021.01); *H01M 50/247* (2021.01); *H01M 50/262* (2021.01); *H01M 50/271* (2021.01); *H02J 7/0029* (2013.01); *H02J 7/0042* (2013.01); *H02J 7/0044* (2013.01); *H02J 7/0045* (2013.01); *H01M 2220/30* (2013.01)

(58) Field of Classification Search
CPC .... A47L 9/2873; A47L 9/2884; H02J 7/0029; H02J 7/0042; H02J 7/0044; H02J 7/0045; H01M 2220/30
See application file for complete search history.

(56) References Cited

U.S. PATENT DOCUMENTS 5,014,388 A * 5/1991 Schiazza ............... A47L 9/2889
15/351
6,326,766 B1 12/2001 Small
(Continued)

FOREIGN PATENT DOCUMENTS

AU 2014281335 A1 1/2016
CA 2774751 A1 10/2012
(Continued)

*Primary Examiner* — Richard Isla
*Assistant Examiner* — Sadia Kousar
(74) *Attorney, Agent, or Firm* — Armstrong Teasdale LLP (57) ABSTRACT

A rechargeable battery for powering a vacuum cleaner includes a casing, a latch for securing the rechargeable battery in the vacuum cleaner, an electrical connection interface, and a battery core disposed within the casing. The casing includes a cover plate, a sidewall extending from the cover plate, and first and second rails that extend longitudinally along the cover plate. Each rail is L-shaped and includes ribs for support. The latch is selectively releasable, and the electrical connection interface is disposed between the first and second rails.

18 Claims, 7 Drawing Sheets

(51) Int. Cl.
*H01M 50/247* (2021.01)
*H01M 50/244* (2021.01)

(56) References Cited

U.S. PATENT DOCUMENTS

| | | | | |
|---|---|---|---|---|
| 6,346,793 | B1 * | 2/2002 | Shibata | H02J 7/0042 |
| | | | | 429/97 |
| 6,646,414 | B2 | 11/2003 | Small | |
| 7,696,721 | B2 * | 4/2010 | Young | H02J 7/0068 |
| | | | | 361/600 |
| 8,343,654 | B2 * | 1/2013 | Churchill | H02J 7/0045 |
| | | | | 429/163 |
| 10,413,146 | B2 * | 9/2019 | Williams | H02P 4/00 |
| 10,687,678 | B2 | 6/2020 | Gierer | |
| 2002/0030467 | A1 * | 3/2002 | Small | H01M 50/213 |
| | | | | 320/107 |
| 2005/0225296 | A1 | 10/2005 | Tashiro et al. | |
| 2008/0267628 | A1 * | 10/2008 | Li | H04B 10/2755 |
| | | | | 398/79 |
| 2009/0255084 | A1 * | 10/2009 | Gee, II | H01M 50/247 |
| | | | | 429/96 |
| 2010/0250194 | A1 * | 9/2010 | Newhouse | B60R 16/023 |
| | | | | 702/183 |
| 2011/0289716 | A1 | 12/2011 | Williamson et al. | |
| 2012/0137466 | A1 | 6/2012 | Duncan | |
| 2014/0011384 | A1 * | 1/2014 | Xu | H01R 4/36 |
| | | | | 439/271 |
| 2014/0299089 | A1 | 10/2014 | Koenen et al. | |
| 2018/0169851 | A1 * | 6/2018 | Radovich | H02J 7/0045 |

FOREIGN PATENT DOCUMENTS

| | | | |
|---|---|---|---|
| CN | 2167472 | Y | 6/1994 |
| CN | 103693147 | A * | 4/2014 |
| EP | 2941993 | A1 | 11/2015 |
| JP | 4118408 | B2 | 7/2008 |
| JP | 5431625 | B2 | 3/2014 |

\* cited by examiner

FIG. 7

RECHARGEABLE BATTERY FOR POWERING A VACUUM CLEANER

CROSS-REFERENCE TO RELATED APPLICATIONS

This application is a divisional of U.S. patent application Ser. No. 15/620,153, filed on Jun. 12, 2017, the disclosure of which is hereby incorporated by reference in its entirety.

FIELD

The field relates generally to power systems, and more particularly, to a power system including a safety switch to selectively prevent operation of a battery charger when a rechargeable battery is disconnected from the battery charger.

BACKGROUND

Rechargeable batteries are sometimes used to power appliances such as vacuum cleaners. Prior to or after use, a rechargeable battery is connected to a charger that supplies electrical current to the battery to charge the battery. During charging, an electrical connection interface on the charger provides electrical current to the battery. However, the charger may conduct electrical current to objects that contact the electrical connection interface when the battery is disconnected from the charger. Therefore, it is desirable to provide a charger that prevents electrical current flowing to the electrical contacts when the rechargeable battery is disconnected from the charger.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a vacuum cleaning system includes a vacuum cleaner and a rechargeable battery removably connected to the vacuum cleaner. The vacuum cleaning system also includes a charger for the rechargeable battery. The charger includes an electrical connection interface to conduct electrical current to the rechargeable battery. The charger also includes a switch to detect when the rechargeable battery is connected to the charger. The switch is positionable or movable between an ON position and an OFF position. The switch is positioned in the ON position when the rechargeable battery is connected to the charger and in the OFF position when the rechargeable battery is disconnected from the charger. The charger further includes a housing supporting the electrical connection interface and defining an interior space. The switch is at least partially within the interior space. The housing defines a groove and includes a barrier extending across the groove. The barrier prevents movement of the switch to the ON position when the rechargeable battery is disconnected from the charger.

In another aspect, a method of charging a battery using a battery charger includes positioning a rail of the rechargeable battery into a groove defined by a housing. The method also includes positioning a switch between an ON position and an OFF position. The switch is positioned in the ON position when the rechargeable battery is connected to the charger and in the OFF position when the rechargeable battery is disconnected from the charger. The housing includes a barrier extending across the groove to prevent movement of the switch to the ON position when the rechargeable battery is disconnected from the charger. The method further includes conducting electrical current to the rechargeable battery through an electrical connection interface.

In yet another aspect, a rechargeable battery for powering a vacuum cleaner includes a casing. The casing includes a cover plate. The casing also includes a sidewall extending from the cover plate and first and second rails that extend longitudinally along the cover plate. Each rail is L-shaped and includes ribs for support. The rechargeable battery also includes a latch for securing the battery in the vacuum cleaner. The latch is selectively releasable. The rechargeable battery further includes an electrical connection interface disposed between the first and second rails. The rechargeable battery also includes a battery core disposed within the casing.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
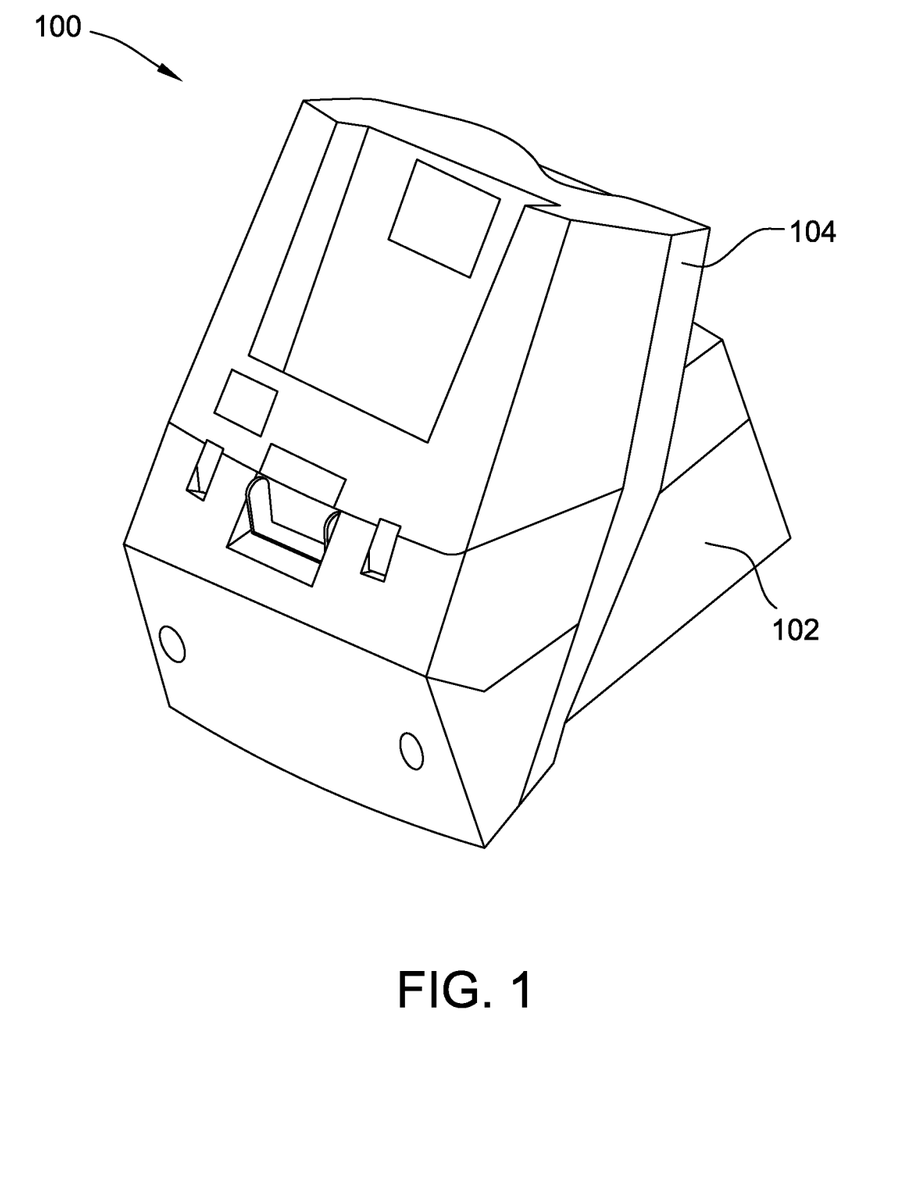
FIG. 1 is a perspective view of an example power system including a rechargeable battery connected to a charger.

FIG. 1 is a perspective view of an example power system 100. Power system 100 includes a charger 102 and a rechargeable battery 104. During operation, rechargeable battery 104 is connected to charger 102. Charger 102 supplies electrical current to rechargeable battery 104 to charge rechargeable battery 104. Charger 102 may be used to charge any suitable battery. In some embodiments, charger 102 may charge more than one battery at a time.

In some embodiments, charger 102 may be connected to a power source (not shown) by a power cord (not shown). For example, the power source may provide alternating current (AC) to charger 102. Charger 102 may convert the AC power to direct current (DC) power for rechargeable battery 104. In other embodiments, charger 102 may be connected to any power source.

In this embodiment, charger 102 protects a user from receiving a shock when rechargeable battery 104 is disconnected from charger 102. In particular, charger 102 stops the flow of electrical current through charger 102 when rechargeable battery 104 is disconnected from charger 102. In addition, charger 102 prevents objects initiating the flow of electrical current while battery 104 is disconnected from charger 102.

Figure 2:
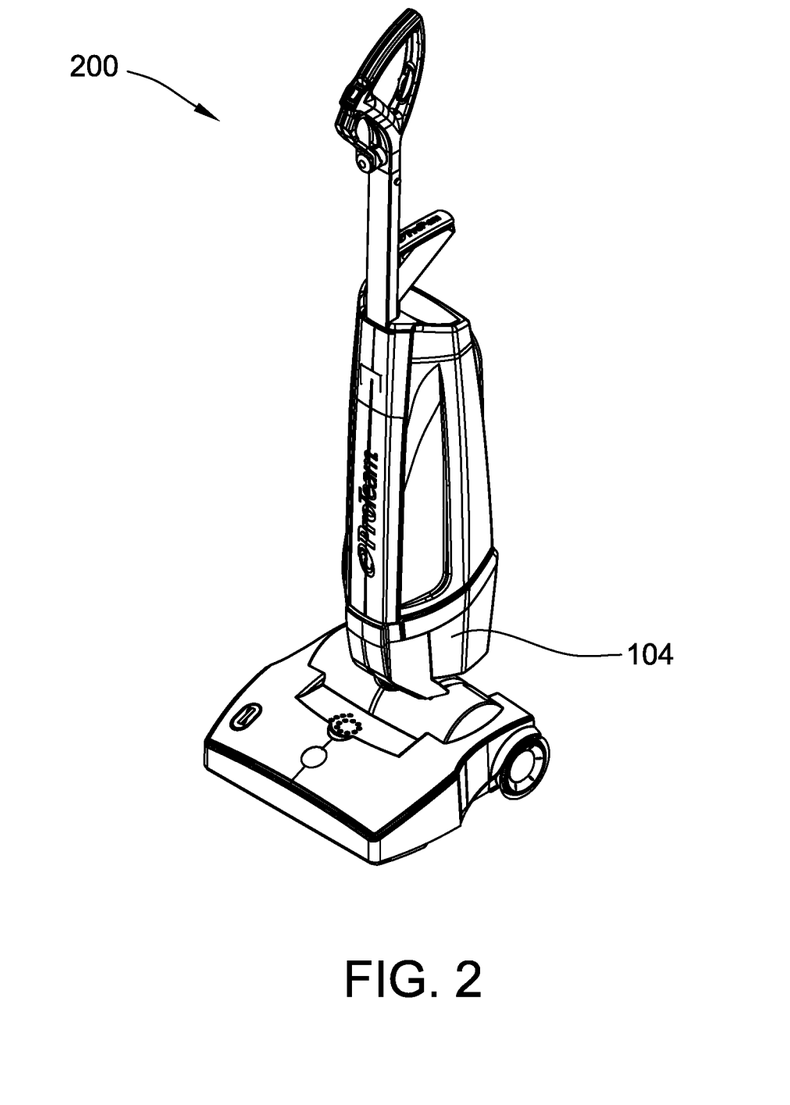
FIG. 2 is a perspective view of the rechargeable battery shown in FIG. 1 connected to a vacuum cleaner.

In reference to FIG. 2, rechargeable battery 104 may be connected to an appliance 200, such as a vacuum cleaner, and provide power to appliance 200. In this embodiment, power system 100 and appliance 200 form a vacuum cleaning system. During operation of appliance 200, stored power in rechargeable battery 104 may be drained. Accordingly, rechargeable battery 104 may be removed from appliance 200 and connected to charger 102 (shown in FIG. 1) to recharge. In other embodiments, rechargeable battery 104 may be used to provide power to any appliance in any suitable manner.

Figure 3:
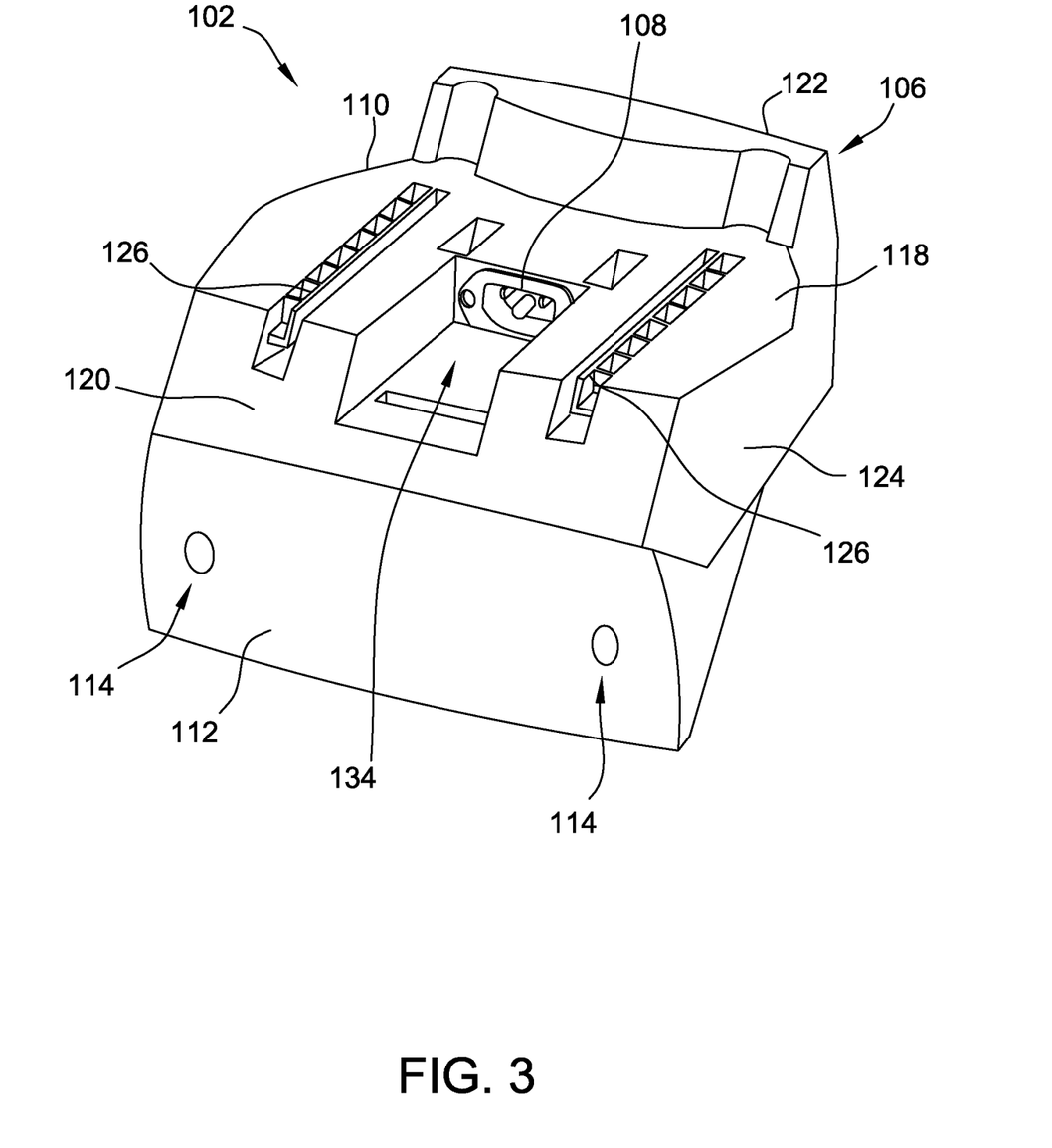
FIG. 3 is a perspective view of the charger shown in FIG. 1.

FIG. 3 is a perspective view of charger 102. Charger 102 includes a housing 106 and an electrical connection interface 108 (shown as a male power connector). Housing 106 includes a top portion 110 and a bottom portion 112. Top portion 110 and bottom portion 112 are connected by fasteners 114 and define an interior space 116 (shown in FIG. 6). Top portion 110 includes a top wall 118, a front wall 120, a rear wall 122, and a pair of sidewalls 124. Sidewalls 124 extend between front wall 120 and rear wall 122. In other embodiments, housing 106 may include any wall that enables housing 106 to function as described.

Figure 4:
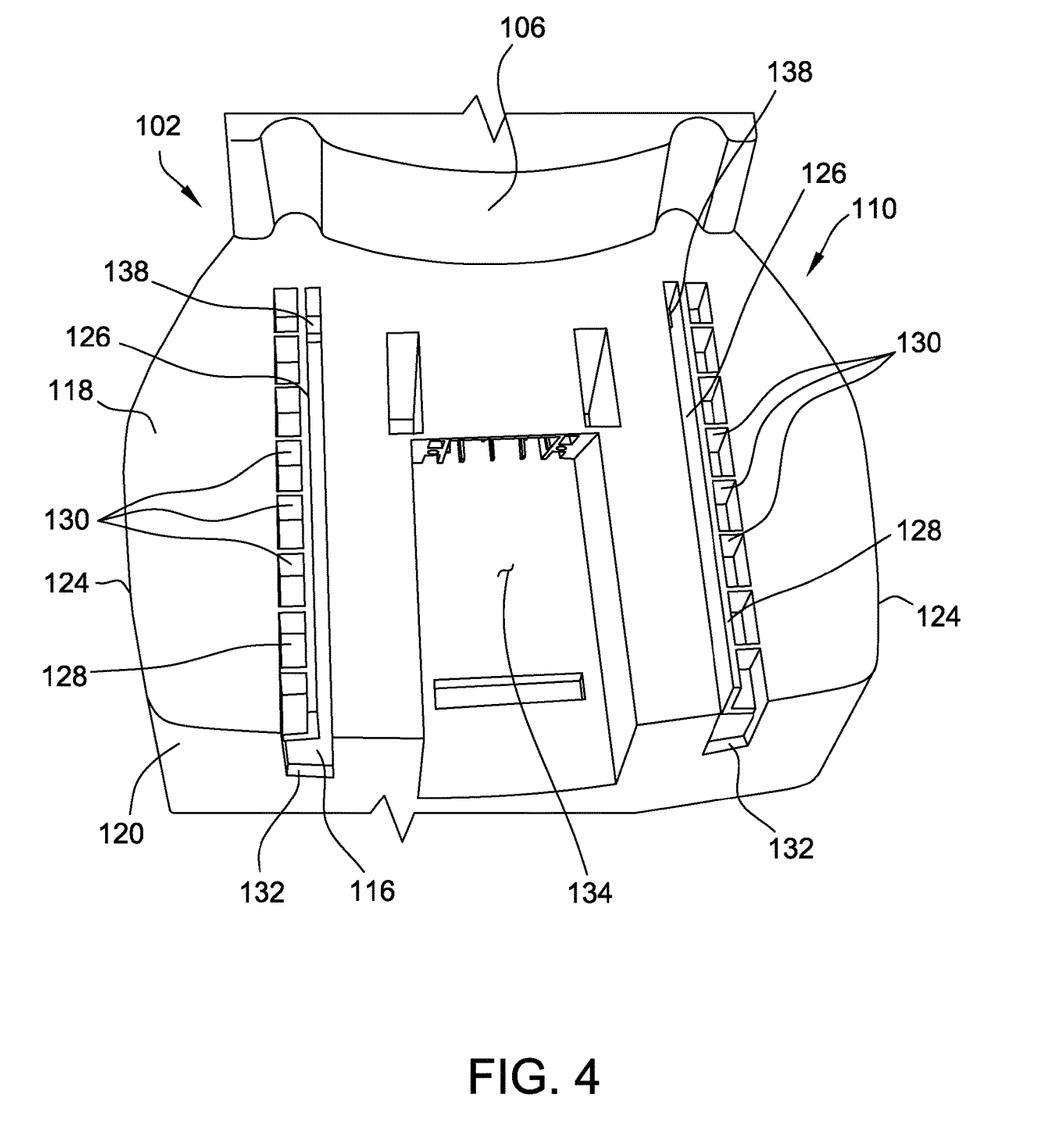
FIG. 4 is a top view of a portion of the charger.
Figure 5:
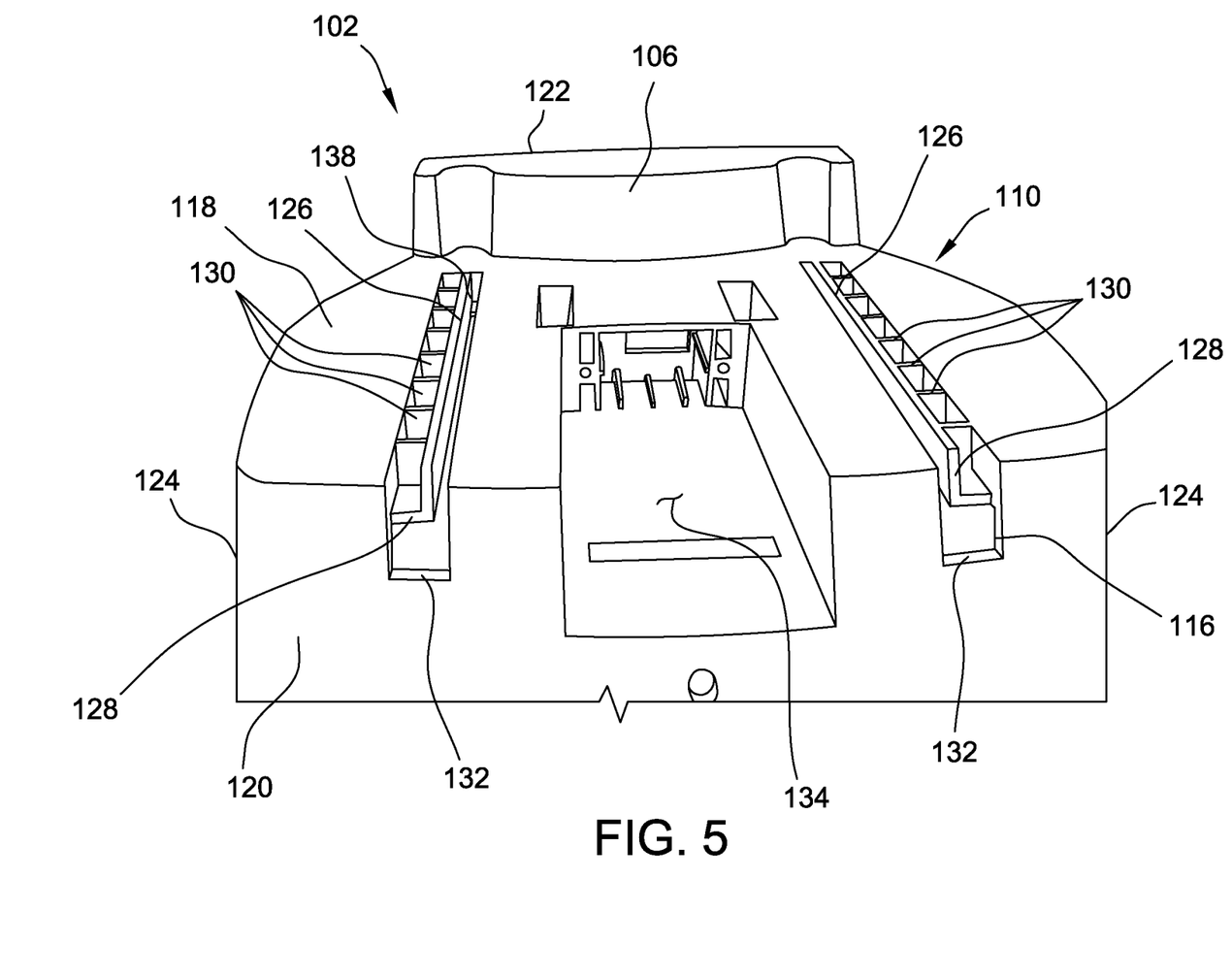
FIG. 5 is a front view of a portion of the charger.

In reference to FIGS. 4 and 5, top portion 110 defines a pair of grooves 126 extending longitudinally along housing 106 to receive rechargeable battery 104. A retaining member 128 extends along each groove 126. Retaining members 128 include elongate plates joined at longitudinal edges to form an angle. Each retaining member 128 is supported by transverse ribs 130. Front wall 120 and retaining members 128 form an L-shape opening 132 at ends of grooves 126. In other embodiments, charger 102 may include any housing that enables charger 102 to operate as described.

As shown in FIG. 3, electrical connection interface 108 is centered between grooves 126. Electrical connection interface 108 includes electrical contacts that contact battery 104 and conduct electrical current to battery 104. In other embodiments, charger 102 may include any electrical connection interface 108 that enables charger 102 to operate as described.

A cavity 134 extends along top portion 110 from front wall 120 to electrical connection interface 108. Cavity 134 receives a portion of battery 104 (shown in FIG. 1) to allow battery 104 to connect to charger 102. In this embodiment, cavity 134 is substantially uncovered. Accordingly, rechargeable battery 104 may be quickly connected to and disconnected from charger 102. In other embodiments, the receiving portion of charger 102 may be at least partially covered. In such embodiments, charger 102 may include a movable cover to allow rechargeable battery 104 to connect to charger 102.

Figure 6:
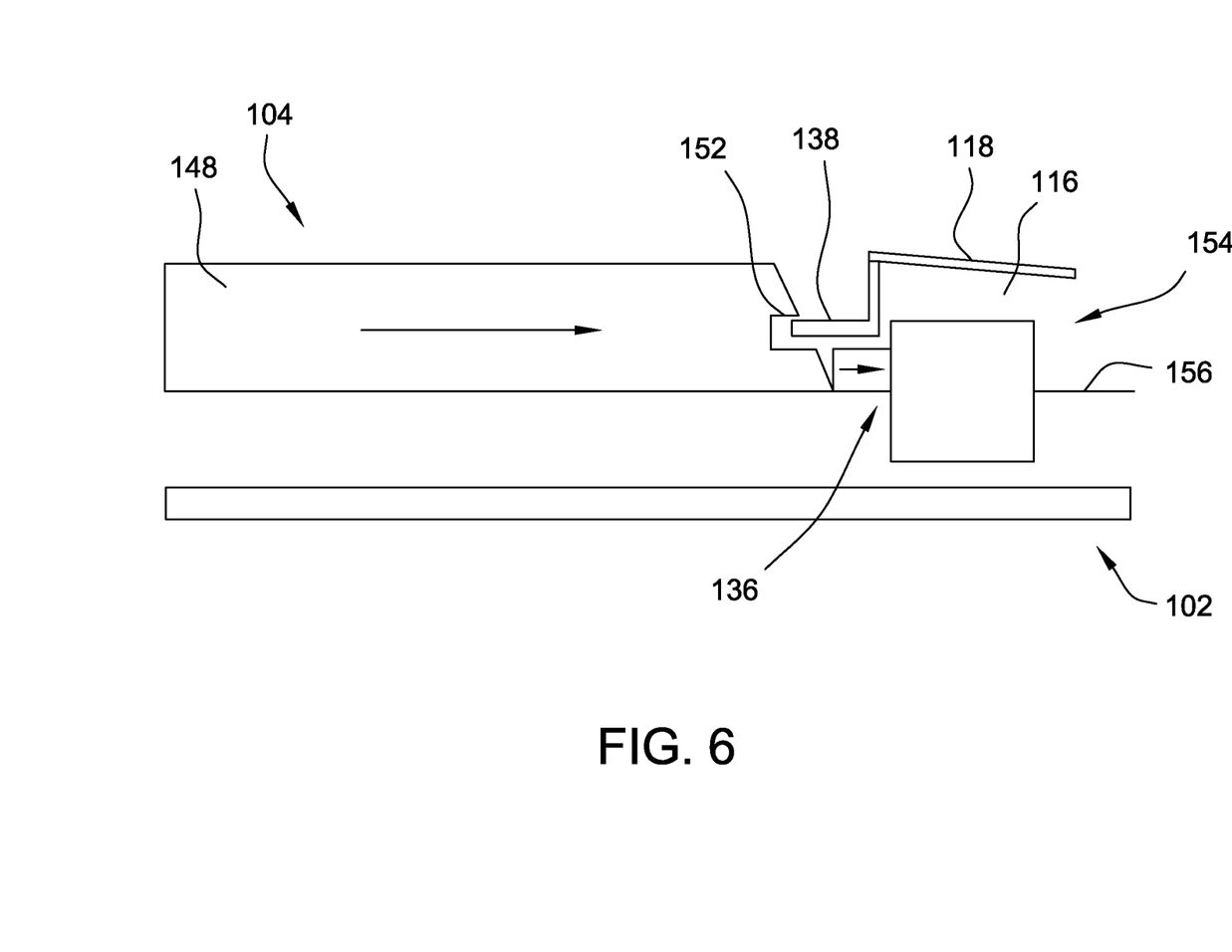
FIG. 6 is a schematic partial view of the rechargeable battery shown in FIG. 1 connecting to the charger shown in FIG. 1.

In reference to FIG. 6, a switch 136 is positioned within interior space 116 at an end of one of grooves 126. Switch 136 moves between an ON position and an OFF position, as described further herein, to detect when rechargeable battery 104 is connected to charger 102. In particular, switch 136 is positioned in the ON position when battery 104 is connected to charger 102, and in the OFF position when battery 104 is disconnected from charger 102. A barrier 138 extends alongside switch 136 to prevent movement of switch 136 to the ON position when battery 104 is disconnected from charger 102.

In this embodiment, barrier 138 includes a planar wall extending away from switch 136 along groove 126 to prevent objects moving through groove 126 contacting switch 136. In this embodiment, a barrier 138 extends across each groove 126. In other embodiments, charger 102 may include any barrier that enables charger 102 to operate as described. For example, in some embodiments barrier 138 is not necessarily located in each groove.

Figure 7:
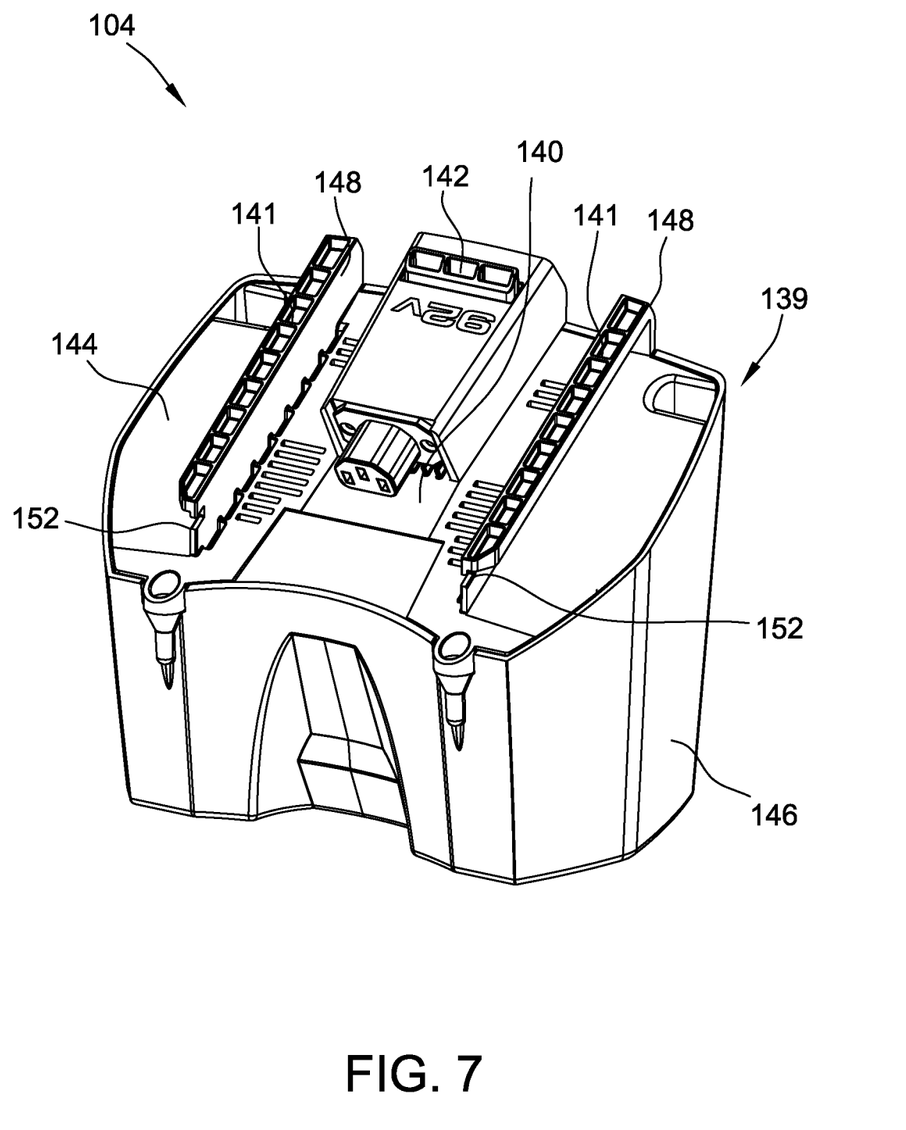
FIG. 7 is a perspective view of the rechargeable battery shown in FIG. 1.

FIG. 7 is a perspective view of rechargeable battery 104. Rechargeable battery 104 includes a casing 139, an electrical connection interface 140 (shown as a female power connector), and a latch 142. Electrical connection interface 140 connects to electrical connection interface 108 (shown in FIG. 3) of charger 102 (shown in FIG. 3). Electrical connection interface 140 and electrical connection interface 108 are electrically connected such that electrical current is transferred from charger 102 to rechargeable battery 104. Casing 139 includes a cover plate 144, a sidewall 146, and first and second rails 148. Sidewall 146 is connected to and extends about an outer edge of cover plate 144. Rails 148 extend longitudinally along cover plate 144 on either side of electrical connection interface 140. In other embodiments, rechargeable battery 104 may include any casing 139 that enables rechargeable battery 104 to operate as described.

In this embodiment, electrical connection interface 108 (shown in FIG. 3) and electrical connection interface 140 conform to standards set by industry authorities. In particular, in this embodiment, electrical connection interface 108 and electrical connection interface 140 conform to standards set by the International Electrotechnical Commission (IEC). Examples of suitable IEC electrical connection interfaces include, without limitation, IEC types A-N sockets and IEC types A-N plugs. In this embodiment, electrical connection interface 108 includes an IEC Appliance type C18 Inlet. As a result, electrical connection interface 108 is compatible with batteries and power cords that include IEC Appliance and Interconnection Couplers. For example, in this embodiment, electrical connection interface 140 includes IEC type C13 and C18 connectors, respectively. In other embodiments, power system 100 may include any electrical connection interfaces 108, 140 that enables power system 100 to operate as described.

In addition, rechargeable battery 104 includes a battery core to store power. The battery core may include any suitable power storage device such as a lithium ion core, a lead-acid core, a nickel-cadmium core, a nickel-zinc core, and a nickel metal hydride core. In some embodiments, when the battery core is at least partially charged, rechargeable battery 104 is capable of providing DC power to an appliance. In other embodiments, rechargeable battery 104 may include any battery core that enables power system 100 to operate as described.

In some embodiments, for example, rechargeable battery 104 has a DC output voltage of between 50 volts DC (VDC) and 140 VDC, between 80 VDC and 140 VDC, between 90 VDC and 130 VDC, between 90 VDC and 120 VDC, between 100 VDC and 120 VDC, or between 90 VDC and 110 VDC. In this embodiment, rechargeable battery 104 has an output voltage of 92.4 VDC. Other suitable output voltages of rechargeable battery 104 include, for example and without limitation, about 80 VDC and about 108 VDC. In other embodiments, rechargeable battery 104 may have any suitable output voltage that enables battery 104 to function as described herein.

In reference to FIGS. 5-7, in this embodiment, rails 148 are received in grooves 126 of charger 102. Each rail 148 is L-shaped and includes a notch 152 on one end to receive barrier 138 (shown in FIG. 3) and allow rail 148 to contact switch 136. In addition, rails 148 include ribs 141 to provide support to rails 148 and minimize the material required for rails 148. Notches 152 are sized and shaped to receive barriers 138. In particular, notches 152 have a thickness greater than a thickness of barriers 138 and a depth greater than a depth of barrier 138. In other embodiments, rechargeable battery 104 may include any rail 148 that enables rechargeable battery 104 to operate as described.

During operation, rails 148 are positioned in L-shaped openings 132 and moved through grooves 126 to connect rechargeable battery 104 to charger 102. Retaining members 128 contact rails 148 and secure battery 104 in position. In addition, retaining members 128 and rails 148 align notches 152 with barriers 138. When rechargeable battery 104 is fully inserted, notches 152 receive barriers 138 and allow rails 148 to extend beyond barrier 138, and rail 148 contacts switch 136 to move switch 136 from the OFF position to the ON position. Latch 142 engages charger 102 and secures rechargeable battery 104 to charger 102. In other embodiments, battery 104 may connect to battery charger 102 in any manner that enables power system 100 to operate as described.

In reference to FIG. 6, electronics 154 are housed within interior space 116 of housing 106. Charger 102 may include any electronics 154 that enable charger 102 to operate as described. In this embodiment, electronics 154 include a circuit 156 and switch 136. Circuit 156 is connected to electrical connection interface 108 such that electrical current flowing through circuit 156 is transferred to rechargeable battery 104 through electrical connection interface 108. Specifically, electrical current flows through circuit 156 to electrical contacts of electrical connection interface 108.

Switch 136 allows electrical current to flow through circuit 156 when rechargeable battery 104 is connected to charger 102 and prevents electrical current flowing through circuit 156 when battery 104 is disconnected from charger 102. Specifically, switch 136 moves between the ON position and the OFF position such that circuit 156 is closed when rechargeable battery 104 is connected to charger 102 and circuit 156 is opened when battery 104 is disconnected from charger 102. In other embodiments, charger 102 may include any switch that enables charger 102 to operate as described. For example, in some embodiments, charger 102 includes more than one switch 136.

Embodiments of the systems described achieve superior results. For example, embodiments of the battery charger include a safety switch to prevent electrical current flowing to an electrical connection interface when the rechargeable battery is disconnected from the charger. In addition, the battery charger includes a barrier to prevent objects other than the rechargeable battery contacting the safety switch. Moreover, the battery and charger are quickly and easily connected and disconnected.

Example embodiments of battery charging systems are described above in detail. The rechargeable battery charging systems are not limited to the specific embodiments described herein, but rather, components of the rechargeable battery charging systems may be used independently and separately from other components described herein. For example, the rechargeable battery charging systems described herein may be used with appliances other than vacuum cleaning systems, including without limitation, power tools, motorized devices, and household appliances.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A rechargeable battery for powering a vacuum cleaner, the rechargeable battery comprising:
   a casing comprising:
      a cover plate,
      a sidewall extending from the cover plate, and
      first and second rails that extend longitudinally along the cover plate and being adapted to receive a charger, each rail comprising a first segment and a second segment oriented to form an L-shape, the first segment including a notch on one end at a forward edge of the first and second rails to receive a barrier of the charger for positioning a switch of the charger, and including ribs for support;
   a latch for securing the rechargeable battery in the vacuum cleaner, the latch being selectively releasable;
   an electrical connection interface disposed between the first and second rails, wherein the second segment of each of the first and second rails extends away from the electrical connection; and
   a battery core disposed within the casing.

2. The rechargeable battery as set forth in claim 1, wherein at least one of the first and second rails contacts the switch of the charger when the rechargeable battery is connected to the charger, and wherein the electrical connection interface is an IEC power connector.

3. The rechargeable battery as set forth in claim 1, wherein the battery core is a lithium-ion battery core.

4. The rechargeable battery as set forth in claim 1, wherein the rechargeable battery is capable of providing from about 50 volts to about 140 volts of direct current (DC) power to a vacuum cleaner.

5. The rechargeable battery as set forth in claim 1, wherein the rechargeable battery is capable of providing from about 80 volts to about 140 volts of direct current (DC) power to a vacuum cleaner.

6. The rechargeable battery as set forth in claim 1, wherein the rechargeable battery is capable of providing from about 90 volts to about 130 volts of direct current (DC) power to a vacuum cleaner.

7. The rechargeable battery as set forth in claim 1, wherein the first and second rails each include at least ten of the ribs to provide support to the rails.

8. The rechargeable battery as set forth in claim 1, wherein the latch is adapted to secure the rechargeable battery in a charger and is releasable by an operator.

9. The rechargeable battery as set forth in claim 1, wherein the electrical connection interface is an IEC power connector.

10. The rechargeable battery as set forth in claim 9, wherein the electrical connection interface comprises one of a C13 type connector and a C18 type connector.

11. A rechargeable battery for powering a vacuum cleaner, the rechargeable battery comprising:
- a casing comprising:
  - a cover plate,
  - a sidewall extending from the cover plate, and
  - first and second rails that extend longitudinally along the cover plate and being adapted to receive a charger, each rail including a notch on one end at a forward edge to receive a barrier of the charger for positioning a switch of the charger and ribs for support;
- a latch for securing the rechargeable battery in the vacuum cleaner, the latch being selectively releasable;
- an electrical connection interface disposed between the first and second rails; and
- a battery core disposed within the casing.

12. The rechargeable battery as set forth in claim 11, wherein the first and second rails each comprise a first segment and a second segment oriented to form an L-shape, wherein the second segment of each of the first and second rails extends away from the electrical connection.

13. The rechargeable battery as set forth in claim 12, wherein at least one of the first and second rails contacts the switch of the charger when the rechargeable battery is connected to the charger.

14. The rechargeable battery as set forth in claim 13, wherein the latch is adapted to secure the rechargeable battery in a charger and is releasable by an operator.

15. The rechargeable battery as set forth in claim 14, wherein the first and second rails each include at least ten of the ribs to provide support to the rails.

16. The rechargeable battery as set forth in claim 11, wherein the battery core is a lithium-ion battery core.

17. The rechargeable battery as set forth in claim 11, wherein the rechargeable battery is capable of providing from about 50 volts to about 140 volts of direct current (DC) power to a vacuum cleaner.

18. The rechargeable battery as set forth in claim 11, wherein the rechargeable battery is capable of providing from about 80 volts to about 140 volts of direct current (DC) power to a vacuum cleaner.

* * * * *